Nov. 22, 1960   R. G. GOLDMAN   2,961,612
SAW TOOTH WAVE FORM GENERATOR
Filed June 17, 1957
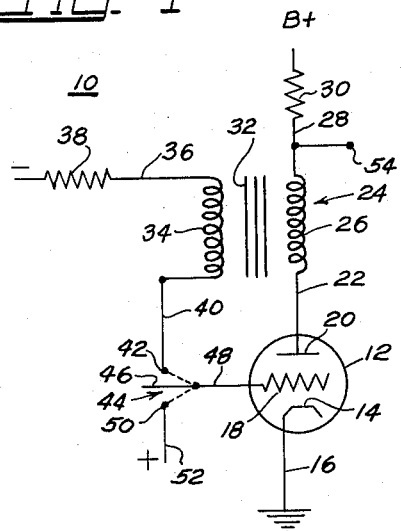
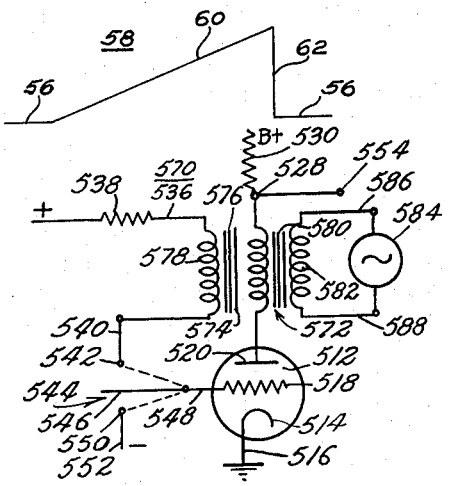
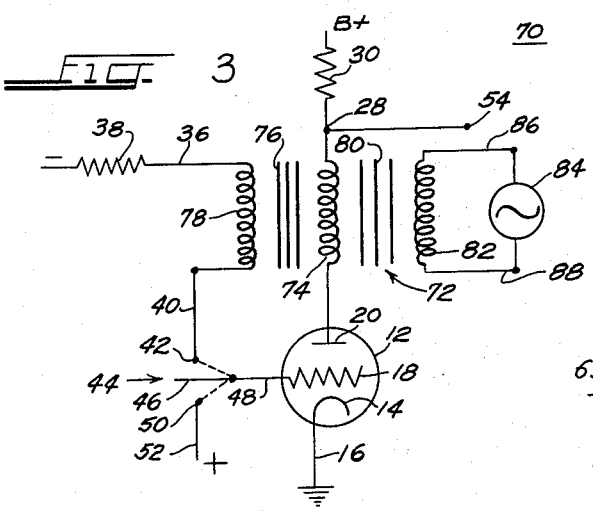
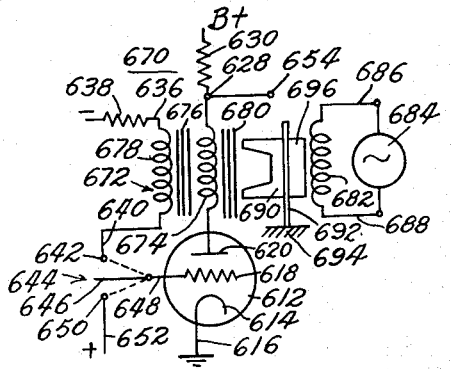
INVENTOR.
RICHARD G. GOLDMAN

United States Patent Office 2,961,612
Patented Nov. 22, 1960

2,961,612

SAW TOOTH WAVE FORM GENERATOR

Richard G. Goldman, Schenectady, N.Y., assignor to General Electric Company, a corporation of New York Filed June 17, 1957, Ser. No. 666,081

12 Claims. (Cl. 328—185)

This invention relates to saw tooth wave form generators and saw tooth wave form generators in which the output wave form can be modulated.

There are many well known circuits and apparatuses for the generation of saw tooth wave forms. Certain of these prior generators have been in the form of integrators which include an amplifying device in combination with an integrating circuit which is suitable to integrate a substantially square wave form to produce a saw tooth wave form output. In general these prior amplifier-integrators for producing saw tooth wave forms have utilized resistances and capacitances as the integrating circuit elements.

It is an object of the present invention to provide an improved saw tooth wave form generator and particularly a generator including an amplifying device and an integrating device of improved construction.

More specifically, it is an object of the present invention to provide a saw tooth wave generator employing an integrating circuit in which the integrating circuit elements are resistances and inductances.

Another object of the invention is to provide a saw tooth wave form generator of the type set forth which uses a transformer connected to provide a negative feed back between an anode and a control grid whereby to form a self contained, independent and linear saw tooth wave form generator.

Yet another object of the invention is to provide a saw tooth wave form generator of the type set forth which can be arranged to generate either a negative going saw tooth wave form or a positive going saw tooth wave form.

Still another object of the invention is to provide an integrating amplifier saw tooth wave form generator of the type set forth in which the slope of the output wave form can be varied and modulated.

Yet another object of the invention is to provide a saw tooth wave form generator of the type set forth in which the slope of the output wave form can be modulated electrically, mechanically or magnetically.

A further object of the invention is to provide a linear saw tooth generator of the type set forth in which the slope of the output is controlled by controlling the inductance values of the inductances providing the degenerative feed back in the amplifier.

In connection with the foregoing object it is a further object of the invention to provide a saw tooth wave form generator in which the slope of the output wave form can be controlled and modulated completely by electrical methods utilizing no moving parts.

These and other objects and advantages of the invention will be better understood from the following description when taken in conjunction with the accompanying drawing. In the drawing wherein like reference numerals have been utilized to designate like parts throughout:

Figure 1 is an electrical schematic diagram of a saw tooth wave form generator made in accordance with and embodying the principles of the present invention;

Figure 2 is a diagram of a saw tooth wave form output obtainable from the circuit of Figure 1, the output being illustrated as positive going in character;

Figure 3 is a schematic electrical diagram of another form of the invention in which means is provided electrically to modulate the slope of the output wave form;

Figure 4 is a diagram illustrating three possible outputs from the saw tooth wave form generator of Figure 3.

Figure 5 is a schematic electrical diagram similar to Figure 3 and showing another form of the invention connected to provide a negative going saw tooth wave form; and Figure 6 is a schematic electrical diagram similar to Figure 3 and showing another form of the invention in which a prmanent magnet is provided to modulate the slope of the output wave form.

Referring to Figure 1 of the drawing there is shown an integrating amplifier made in accordance with and embodying the principles of the present invention and suitable to integrate a substantially square wave form to produce in the output a linear saw tooth wave form. The integrating amplifier which is generally designated by the numeral 10 has been illustrated as utilizing a high vacuum triode 12 as the amplifying device. Triode 12 includes a cathode 14 connected through a line 16 to ground, a control grid 18 and an anode or plate 20. Plate 20 is connected through a line 22 to one terminal of a transformer generally designated by the numeral 24 and more specifically to one terminal of the primary winding 26 of transformer 24. The other terminal of primary winding 26 is connected throgh a line 28 to a load resistance 30. The other end of load resistance 30 is connected to a suitable B+ voltage supply.

Transformer 24 is shown as incorporating therein a core 32 and a secondary winding 34. One terminal of secondary winding 34 is connected through a lead 36 to a resistance 38 which is in turn connected to a source of negative potential. The other end of secondary winding 34 is connected through a lead 40 to a switch contact 42.

Switch contact 42 is part of a switch generally designated by the numeral 44 and including a movable switch arm 46. Switch arm 46 is connected through a lead 48 to control grid 18 of tube 12. A second contact 50 is provided for switch 44, contact 50 being connected through a lead 52 to the source of positive potential.

A positive going saw tooth wave form can be generated utilizing the circuit of Figure 1 as follows. In the quiescent condition, switch arm 46 is in contact with switch contact 50 whereby to apply a positive potential through line 52 to control grid 18 of tube 12. This positive potential on control grid 18 causes tube 12 to conduct heavily through transformer primary 26 and the plate resistance 30. The potential developed across resistance 30 is such as to lower the plate potential of tube 12 and to lower the potential on output point 54 which is disposed at the connection between transformer primary 26 and plate resistance 30. With the circuit components in this position, the relatively low potential portion 56 of the output wave form 58 appearing on output contact 54 is produced. Switch contact arm 46 is then moved into connection with contact 42. This applies a negative potential through transformer secondary 34 and resistor 38 to control grid 18 which is of sufficient amplitude to drive tube 12 into cut off. The potential at the plate 20 and the potential at output point 54 tend to rise immediaely to the value of B+ potential. This change in the current flow through transformer primary 26 produces a flux which in turn induces a potential and a current flow in secondary winding 34. Windings 26 and 34 are connected so that the feed back to coil 34 is negative or highly degenerative. As the result the potential on plate 20 and at output point 54 can rise only in a slow and linear manner. There results a positive going wave form portion 60 which rises steadily in a linear manner. The potential at point 54 cannot rise above that of B+ supply. Before the potential at point 54 reaches the value of the B+ supply, the switch contact 46 is moved into contact with contact 50 whereby to apply a high positive potential to control grid 18. This action causes tube 12 to conduct heavily and drops the potential on plate 20 and output point 54 abruptly to provide the negative going portion 62 of wave form 58. The potential at point 54 drops to the quiescent value 56.

A negative going output wave form can be produced by operating the integrating amplifier 10 as follows. The potentials applied to line 52 and resistance 38 are reversed. More specifically, a negative potential is applied to contact point 50 through line 52 and a positive potential is applied to contact 42 through resistance 38 and transformer secondary 34. Switch contact 46 in the quiescent condition is moved into engagement with contact 50 whereby to apply a cut off potential to control grid 18. As a result the potential on plate 20 and at the output point 54 will be that of the B+ supply. Switch arm 48 is then moved into contact with point 42 whereby to apply a high positive potential to control grid 18. Tube 12 begins to conduct and tends to conduct heavily. Because of the heavy conduction through tube 12, there is a tendency for the potential on plate 20 and at the output point 54 to fall because of the voltage drop across plate resistance 30. The change in the potential on plate 20 through transformer primary 26 produces an electromotive force causing a degenerative feed back to be induced in transformer secondary 34. The degenerative feed back through secondary 34 counteracts the high positive potential applied through resistor 38 and as a result the conduction through tube 12 increases slowly and at a steady and linear rate. The result is that the potential on plate 20 and at output point 54 falls slowly from B+ to a predetermined value. Switch arm 46 is then moved into contact with point 50 whereby to send tube 12 into cut off. This causes a positive going relatively short wave portion which returns the potential on point 54 to the quiescent potential which is the B+ potential.

The gain of the amplifying tube 12 coupled with the high degree of transformer feed back forms a self contained, independent and linear saw tooth generator. In certain instances it may be desirable to amplify the output from the secondary winding 34 before applying the output therefrom to the control grid 18.

Other amplifying devices besides the high vacuum triode 12 may be used. More specifically, an equivalent semi-conductor device can be used provided that the appropriate circuit connections are made.

The switch 44 is preferably electronic in character although it has been shown as being mechanical in nature in Figure 1 of the drawing. In essence the switch connected to control grid 18 must be operative alternately to drive tube 12 into cut off and then into heavy conduction. The switch also must connect the transformer secondary 34 in the control grid circuit when it is desired to generate the steadily rising or falling saw tooth wave portion and to disconnect the transformer secondary 34 when the short wave portion which may be termed the recovery or fly back portion is being generated.

There is illustrated in Figure 3 of the drawing another form of the invention in which means is provided to modulate the output wave form slope. Where applicable like reference numerals have been applied when there are like parts corresponding to similarly identified parts in Figure 1 of the drawing.

The saw tooth generator of Figure 3 is generally designated by the numeral 70 and includes a triode 12 like triode 12 described above and including a cathode 14, a control grid 18 and a plate 20. Cathode 14 is connected to ground through a line 16.

A transformer having three coils wound thereon and generally designated by the numeral 72 is provided. Transformer 72 includes a primary winding 74 substantially like primary winding 26 described above. One end of winding 74 is connected to plate 20 and the other terminal of winding 74 is connected to a line 28. Line 28 also connects to one end of a resistance 30 and the other end of resistance 30 is connected to a suitable B+ potential supply.

A first core section 76 is provided for transformer 72, core section 76 being positioned between primary winding 74 and a first secondary winding 78. Secondary winding 78 has one end thereof connected to a line 40 which in turn connects with a switch contact 42. The other terminal of coil 78 is connected through a line 36 to a resistance 38. A negative potential is applied to the other end of resistance 38, the negative potential being sufficient to drive tube 12 into cut off when applied to control grid 18.

Connected to control grid 18 is a line 48 which connects with the movable contact arm 46 of a switch generally designated by the numeral 44. There also is provided a second switch contact 50 connecting with a lead 52 to which a high positive voltage can be applied.

Transformer 72 is provided with a second core section 80 which has associated therewith a third or bias winding 82. Bias winding 82 is connected across a source of alternating voltage 84 through lines 86 and 88. Transformer 72 is so constructed and arranged that the flux generated by bias winding 82 flows in both core sections 76 and 80 and thus can induce voltages in and affect the inductance of windings 74 and 78. Accordingly, when the core material of core sections 76 and 80 is brought near to saturation by a flow of current through bias winding 82, the inductance of the primary winding 74 and the secondary winding 78 and their mutual inductance will change. Accordingly, the wave form generated at the output point 54 will change because of the change in degenerative feed back from primary winding 74 to secondary winding 78 during formation of the saw tooth wave form.

Examples of certain of the different output wave forms obtainable from generator 70 are shown in Figure 4 of the drawing. Different slopes of output wave forms are obtained depending upon the current flow in the bias winding 82. Accordingly, the slope of the output wave form which is generally designated by the numeral 90 can be modulated for measurement purposes or to transmit intelligence.

The basic operation of the integrating amplifier circuit of Figure 3 is the same as that of Figure 1 above. Other amplifying devices besides triode 12 can be used as has been explained above and preferably the switch 44 is electronic in character. By reversing the potentials applied through contacts 42 and 50 a negative going slope can be generated as has also been explained above. There is shown in Figure 5 of the drawing a circuit arranged and connected like the circuit of Fig. 3 but with the potentials applied to the control grid of the tube reversed. Since the circuit of Figure 5 is identical with that of Figure 3, the same reference numerals have been applied but preceded with the identifying numeral "5," whereby the saw tooth generator 570 includes a tube 512 and a transformer 572 having three windings thereon. All of the connections for the generator 570 are like those of the generator 70 with the exception that the resistance 538 has been illustrated as being connected to a source of positive potential and the lead 552 has been shown connected to a source of negative potential sufficient to cut off the tube 512. The generator 570 when connected as illustrated in Figure 5 will produce a negative going saw tooth wave form between the output point 554 and ground potential.

Other means can be used to change the inductance and mutual inductance of transformer 72. For example a permanent magnet may alternately be brought near and taken away from the core section 76 whereby to change the inductance of the windings associated therewith and the mutual inductance therebetween. This will also modulate the slope of the output wave form 90. There is shown in Figure 6 of the drawing a circuit arranged and connected like the circuit of Figure 3 but utilizing a permanent magnet 690 to modulate the slope of the output wave form. Since the circuit of Figure 6 includes all of the elements of Figure 3, the same reference numerals have been applied but preceded by the identifying numeral "6," whereby the saw tooth generator 670 includes a tube 612 and a transformer 672 having two windings 674 and 678 thereon instead of the three windings of the transformer 72. The permanent magnet 690 is mounted on a flexible support 692 having the lower end thereof fixed to a stationary member 694, the flexible support 692 also carrying a member 696 formed of magnetic material and disposed within the field of the winding 682. All other connections and arrangements for the generator 670 are like those for the generator 70. As the generator 684 alternately energizes and de-energizes the winding 682, the magnet 690 will be moved alternately away from and toward the core 680 of the transformer 672 to change the inductance and mutual inductance thereof, thereby to modulate the slope of the output wave form at the point 654.

It will be seen that there has been provided a saw tooth wave form generator of the integrating amplifier type utilizing inductances having degenerative feed back between the plate and the control grid circuits which possess the advantages and satisfy the objects of the invention set forth above. Although two preferred forms of the invention have been shown for purposes of illustration, it is to be understood that various changes and modifications can be made therein without departing from the spirit and scope of the invention. Accordingly, the invention is to be limited only as set forth in the following claims.

What is claimed is:

1. A saw tooth wave form generator comprising an amplifying device having a first electrode and a second electrode, a first inductance having one end thereof connected to said first electrode, a load resistance having one end thereof connected to the other end of said first inductance and having the other end thereof connected to a source of B+ potential, an output joint at the junction of said first inductance and said load resistance, said second electrode being effective to control the flow of current through said amplifying device, a second inductance arranged and connected so that a degenerative signal is fed back from said first inductance to one end of said second inductance, a second resistance having one end thereof connected to the other end of said second inductance and having the other end thereof connected to a source of negative potential sufficient to interrupt conduction of said amplifying device, a source of positive potential for said second electrode sufficient to cause heavy conduction of said amplifying device, and means alternately to connect said second electrode to said one end of said second inductance and to said source of positive potential to produce a linear saw tooth wave form on the output point at the junction of said first inductance and said load resistance.

2. A saw tooth wave form generator comprising an amplifying device having a first electrode and a second electrode, a first inductance having one end thereof connected to said first electrode, a load resistance having one end thereof connected to the other end of said first inductance and having the other end thereof connected to a source of B+ potential, an output point at the junction of the said first inductance and said load resistance, said second electrode being effective to control the flow of current through said amplifying device, a second inductance arranged and connected so that a degenerative signal is fed back from said first inductance to one end of said second inductance, a second resistance having one end thereof connected to the other end of said second inductance and having the other end thereof connected to a source of positive potential sufficient to cause heavy conduction of said amplifying device, a source of negative potential for said second electrode sufficient to interrupt conduction of said amplifying device, and means alternately to connect said second electrode to said one end of said second inductance and to said source of negative potential to produce a linear saw tooth wave form on the output point at the junction of said first inductance and said load resistance.

3. A saw tooth wave form generator comprising a high vacuum amplifying tube having an anode and a cathode and a control grid, a first inductance having one end thereof connected to said anode, a load resistance having one end thereof connected to the other end of said first inductance and having the other end thereof connected to a source of B+ potential, an output point at the junction of said first inductance and said load resistance, means connecting said cathode to ground potential, a second inductance arranged and connected so that a degenerative signal is fed back from said first inductance to one end of said second inductance, a second resistance having one end thereof connected to the other end of said second inductance and having the other end thereof connected to a source of negative potential sufficient to interrupt conduction of said tube, a source of positive potential for said control grid sufficient to cause heavy conduction of said tube, and means alternately to connect said control grid to said one end of said second inductance and to said source of said positive potential to produce a linear saw tooth wave form on the output point at the junction of said first inductance and said load resistance.

4. A saw tooth wave form generator comprising a high vacuum amplifying tube having an anode and a cathode and a control grid, a first inductance having one end thereof connected to said anode, a load resistance having one end thereof connected to the other end of said first inductance and having the other end thereof connected to a source of B+ potential, an output point at the junction of said first inductance and said load resistance, means connecting said cathode to ground potential, a second inductance connected so that a degenerative signal is fed back from said first inductance to one end of said second inductance, a second resistance having one end thereof arranged and connected to the other end of said second inductance and having the other end thereof connected to a source of positive potential sufficient to cause heavy conduction of said tube, a source of negative potential for said control grid sufficient to interrupt conduction of said tube, and means alternately to connect said control grid to said one end of said second inductance and to said source of negative potential to produce a linear saw tooth wave form on the output point at the junction of said first inductance and said load resistance.

5. A saw tooth wave form generator comprising an amplifying device, an electrode connected to a source of B+ potential, a second electrode connected to control the flow of current through said amplifying device, an inductance connected to feed a degenerative signal from said first electrode to said second electrode to vary the potential on said second electrode in accordance with changes in potential on said first electrode, means to apply a potential to said second electrode alternately to interrupt conduction of said amplifying device and alternately to cause substantial conduction of said amplifying device, and means to vary the degenerative signal feed from said first electrode to said second electrode.

6. A saw tooth wave form generator comprising an amplifying device, a first electrode for said amplifying device connected through a first inductance to a source of B+ potential, a second electrode for said amplifying device to control the flow of current through said amplifying device, a second inductance mounted and connected so that a degenerative signal is fed back from said first inductance to one end of said second inductance, means alternately to apply a potential to said second electrode to interrupt conduction of said amplifying device and alternately to cause substantial conduction of said amplifying device to produce a saw tooth wave form on said first electrode, said applying means connecting said one end of said second inductance to said second electrode during generation of the saw tooth wave form on said first electrode, and means operative to change the inductance values of said first and second inductances.

7. A saw tooth wave generator as set forth in claim 6, wherein said inductance changing means is a third inductance mounted adjacent the first inductance and the second inductance.

8. A saw tooth wave form generator as set forth in claim 6, wherein said inductance changing means is a permanent magnet.

9. A saw tooth wave form generator comprising an amplifying device having a first electrode and a second electrode, a first inductance having one end thereof connected to said first electrode, a load resistance having one end thereof connected to the other end of said first inductance and having the other end thereof connected to a source of B+ potential, said second electrode being effective to control the flow of current through said amplifying device, a second inductance connected so that a degenerative signal is fed back from said first inductance to one end of said second inductance, means alternately to apply a potential to said second electrode to interrupt conduction of said amplifying device and alternately to cause substantial conduction of said amplifying device to produce a saw tooth wave form across said load resistance, said applying means connecting said one end of said second inductance to said second electrode during generation of the saw tooth wave form across said load resistance, a third inductance mounted in interacting field relationship with said first and second inductances, and an alternating current generator connected to said third inductance to vary the inductance values of said first and second inductances.

10. A saw tooth wave form generator comprising a high vacuum amplifying tube having an anode and a cathode and a control grid, a first inductance having one end thereof connected to said anode, a load resistance having one end thereof connected to the other end of said first inductance and having the other end thereof connected to a source of B+ potential, a second inductance mounted in field intercepting relationship with said first inductance and connected such that a degenerative signal is fed back from said first inductance to one end of said second inductance, means alternately to apply a potential to said control grid to interrupt conduction of said tube and alternately to cause substantial conduction of said tube to produce a saw tooth wave form across said load resistance, said applying means connecting said one end of said second inductance to said control grid during generation of the saw tooth wave form, a third inductance mounted in field intercepting relationship with said first and second inductances, and an alternating current generator connected to said third inductance and operative to modulate the slope of the saw tooth wave form appearing across said load resistance.

11. A saw tooth wave form generator comprising a high vacuum amplifying tube having an anode and a cathode and a control grid, a first inductance having one end thereof connected to said anode, a load resistance having one end thereof connected to the other end of said first inductance and having the other end thereof connected to a source of B+ potential, a second inductance mounted in field intercepting relationship with said first inductance and connected such that a degenerative signal is fed back from said first inductance to one end of said second inductance, a second resistance having one end thereof connected to the other end of said second inductance and having the other end thereof connected to a source of potential sufficient to interrupt conduction of said tube, a source of potential for said control grid sufficient to cause heavy conduction of said tube, means alternately to connect said control grid to said one end of said second inductance and to said heavy conduction potential, a third inductance mounted in field intercepting relationship to said first and second inductance, and an alternating current generator connected to said third inductance to vary the mutual inductances among said inductances whereby to modulate the slope of the saw tooth wave form appearing across said load resistance.

12. A saw tooth wave form generator comprising a high vacuum amplifying tube having an anode and a cathode and a control grid, a first inductance having one end thereof connected to said anode, a load resistance having one end thereof connected to the other end of said first inductance and having the other end thereof connected to a source of B+ potential, a second inductance mounted in field intercepting relationship with said first inductance and connected such that a degenerative signal is fed back from said first inductance to one end of said second inductance, a second resistance having one end thereof connected to the other end of said second inductance and having the other end thereof connected to a source of potential sufficient to cause heavy conduction of said tube, a source of potential for said control grid sufficient to interrupt conduction of said tube, means alternately to connect said control grid to said one end of said second inductance and to said interrupting potential, a third inductance mounted in field intercepting relationship to said first and second inductances, and an alternating current generator connected to said third inductance and operative to vary the mutual inductance among said inductances whereby to modulate the slope of the saw tooth wave form appearing across said load resistance.

References Cited in the file of this patent

UNITED STATES PATENTS

| 2,233,596 | Faudell | Mar. 4, 1941 |
| 2,411,573 | Holst et al. | Nov. 26, 1946 |
| 2,466,782 | Robbins | Apr. 12, 1949 |
| 2,482,150 | Bocciarelli | Sept. 20, 1949 |
| 2,516,533 | Slack | July 25, 1950 |
| 2,530,427 | Frederick | Nov. 21, 1950 |
| 2,595,124 | Campbell | Apr. 29, 1952 |
| 2,611,872 | Lockhart | Sept. 23, 1952 |
| 2,617,925 | Young | Nov. 11, 1952 |
| 2,662,197 | Comte | Dec. 8, 1953 |
| 2,673,321 | Stimler | Mar. 23, 1954 |
| 2,713,638 | Whitaker | July 19, 1955 |
| 2,739,234 | Houghton | Mar. 20, 1956 |
| 2,810,080 | Trousdale | Oct. 15, 1957 |
| 2,816,230 | Lindsay | Dec. 10, 1957 |